United States Patent [19]

Allison

[11] 3,918,574

[45] Nov. 11, 1975

[54] MULTIPLE D.C. PERMANENT MAGNET MOTOR DRIVE FOR BELT TYPE CONVEYORS

[75] Inventor: Arthur F. Allison, Aurora, Colo.

[73] Assignee: Cutler-Hammer, Inc., Milwaukee, Wis.

[22] Filed: Oct. 7, 1974

[21] Appl. No.: 512,455

[52] U.S. Cl. ............ 198/203; 198/110; 310/75 D; 318/113
[51] Int. Cl.² ......................................... B65G 23/00
[58] Field of Search ............ 198/203, 165, 76, 110, 198/162, 190; 310/68 D, 75 D, 152, 154, 156, 112–114; 318/85, 113

[56] References Cited
UNITED STATES PATENTS

| | | | |
|---|---|---|---|
| 1,189,180 | 6/1916 | Sinback | 310/75 D |
| 1,636,560 | 7/1927 | Hall | 310/75 D |
| 2,304,419 | 12/1942 | Pratt | 198/203 |
| 2,310,098 | 2/1943 | Lessmann | 318/113 |
| 2,393,563 | 1/1946 | Petterson | 198/203 |
| 2,652,919 | 9/1953 | Jochem | 198/203 |
| 3,176,207 | 3/1965 | Wallace | 318/85 |
| 3,686,524 | 8/1972 | Hall | 310/154 |
| 3,785,513 | 1/1974 | Kitzinger et al. | 198/110 |

Primary Examiner—Richard A. Schacher
Assistant Examiner—Joseph E. Valenza
Attorney, Agent, or Firm—Hugh R. Rather; William A. Autio

[57] ABSTRACT

A multiple D.C. motor drive for wire and other belt type of conveyors is disclosed. D.C. permanent magnet motors with their armatures electrically connected in series to an adjustable voltage power supply are used. The armatures of the motors are directly connected to the conveyor roller or pulley drive shaft at spaced points along the conveyor run. A preferred form for such motors and a simple driving and mounting arrangement therefor are also disclosed.

6 Claims, 4 Drawing Figures

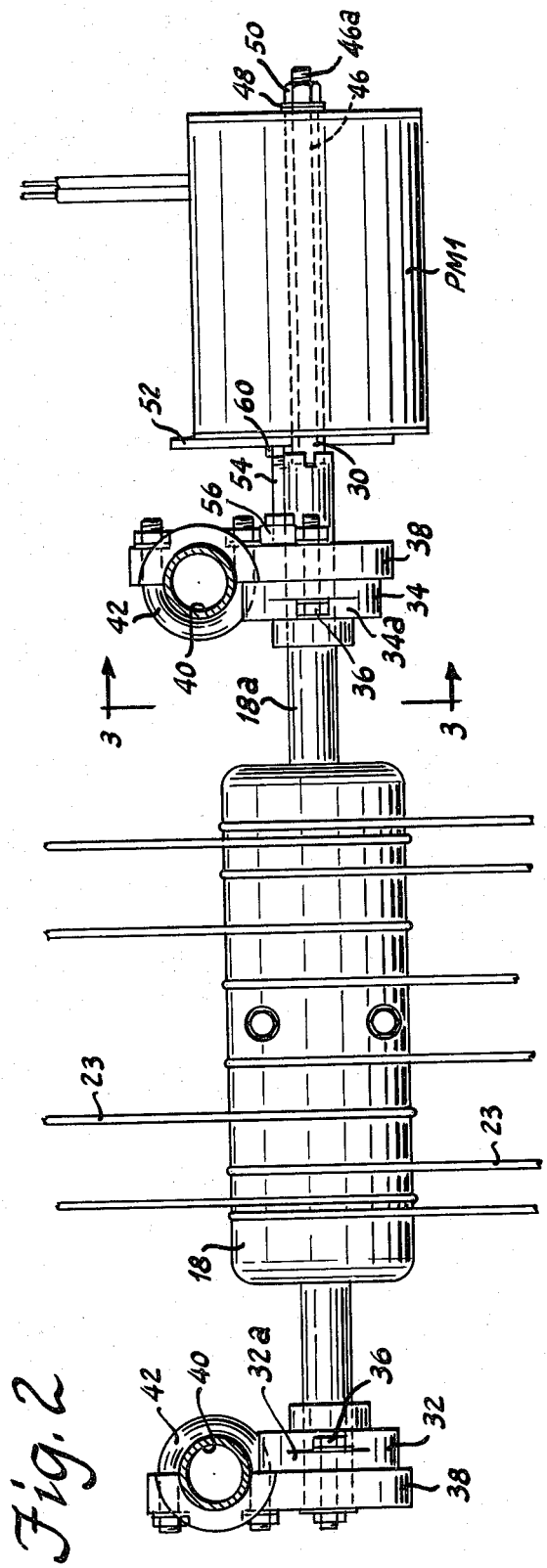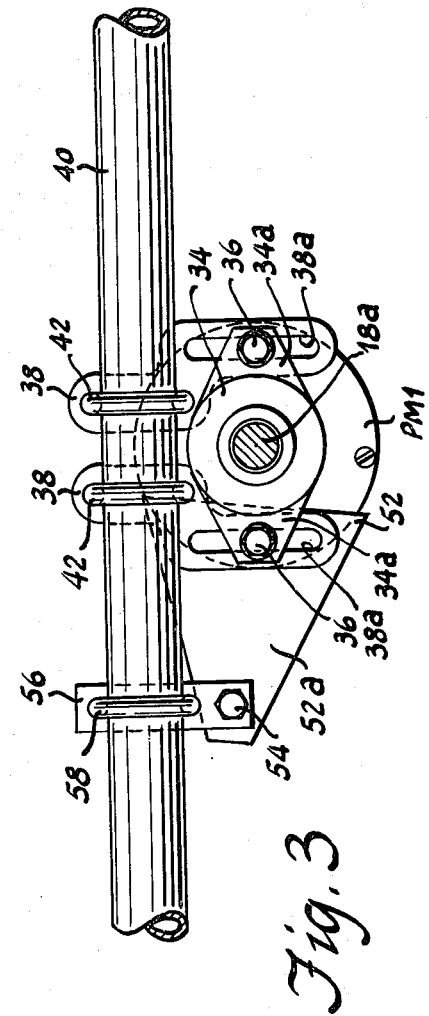

3,918,574

MULTIPLE D.C. PERMANENT MAGNET MOTOR DRIVE FOR BELT TYPE CONVEYORS

BACKGROUND OF THE INVENTION

Double wire belt conveyors, such as those used in newspaper and publishing plants to convey papers from a press folder to a mail room or loading dock, were originally afforded drive from the printing press folder. Chain and sprocket drive transmission were commonly used to provide driving torque to conveyor dirve rollers or pulleys at spaced points along the conveyor run. This enabled the conveyor to run in synchronism with the speed and output rate of the printing press folder.

Over the years the weight and size of such articles has increased. Also the conveyor runs have increased in length and complexity to the point where the total driving torque requirements of many newspaper conveyors exceed that which can be practically obtained from the press folder. Thus, in recent years separate single or multiple electric motor drives for such conveyors have become prevelant. Both A.C. and D.C. drive motors have been used, and variable frequency or adjustable voltage supply systems under the control of a tachometer generator driven by the press folder have been used therewith. The motors employed have in most cases been relatively expensive gear head motors requiring special mounting arrangements.

While such single or multiple electric motor conveyor drives have generally proved satisfactory they are relatively expensive and are somewhat difficult in respect of equalizing their exerted driving torques at low conveyor speeds.

OBJECTS OF THE INVENTION

It is a primary object of the present invention to provide an improved multiple electric motor drive which is particularly suitable for use with belt or web type article conveyors.

Another object of the invention is to provide a drive of the aforementioned type which is characterized by automatically insuring that all of the motors run at the same speed and exert equal torques to the conveyor drive rollers or shafts.

A further object of the invention is to provide a conveyor drive employing electric motors which have their armature shafts directly mechanically connected to the conveyor drive rollers or shafts in a one-to-one driving ratio without need for speed reducing gearing, and A still further object is to provide a simple and relatively inexpensive mounting arrangement for such conveyor drive motors on belt type conveyors.

Other objects and advantages of the invention will hereinafter appear.

BRIEF DESCRIPTION OF THE DRAWINGS

FIG. 2 is a view in some detail of a preferred form of driving motor and its mounting on a conveyor.

FIG. 3 is a view taken along the line 3—3 of FIG. 2, and

DESCRIPTION OF A PREFERRED EMBODIMENT

Figure 1:
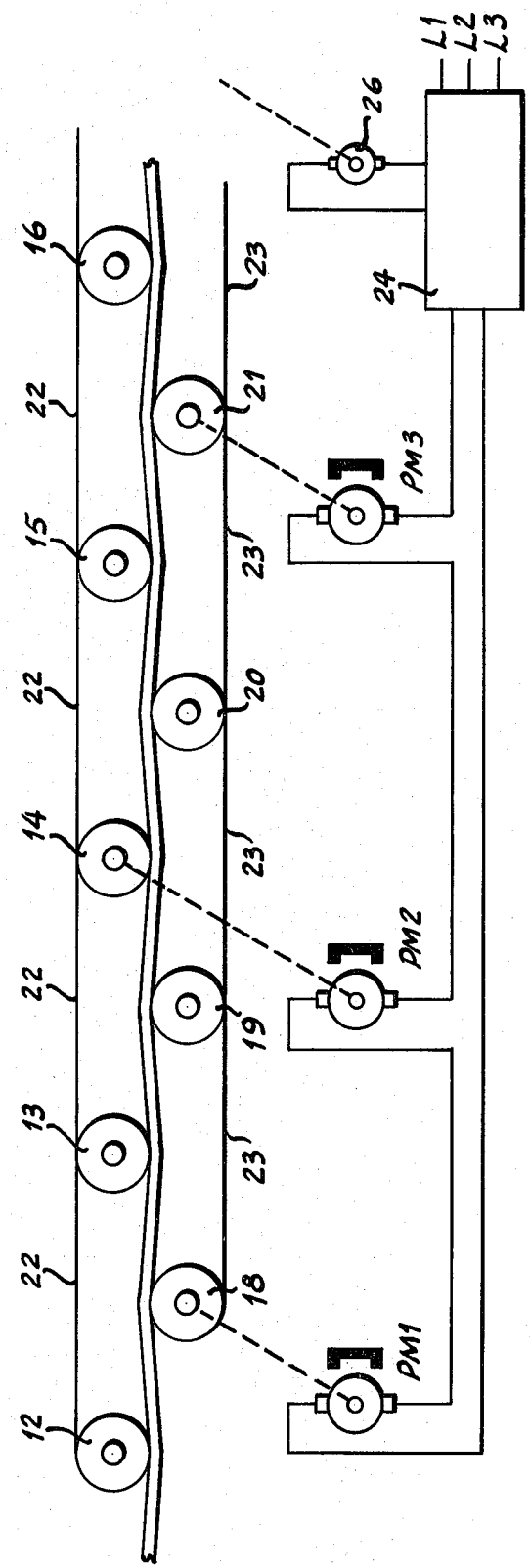
FIG. 1 is a schematic view of a portion of a wire belt conveyor which incorporates the invention.

Referring to FIG. 1, it shows a horizontal run portion of a double wire belt conveyor wherein newspapers or the like are conveyed in an overlapped relation between upper and lower belts. More particularly the conveyor portion comprises upper belt rollers 12 to 16 and lower belt rollers 18 to 21 respectively. It may be assumed that continuous loop wire belts, such as the upper belts 22 and lower belts 23, are supported in circumfrential grooves in the rollers at spaced intervals across the width of the rollers. The lower rollers 18 and 21 are directly driven by the armature shaft of D.C. permanent magnet motors PM1 and PM3 and the upper roller 14 is directly driven by a similar motor PM2.

The armatures of the motors PM1, PM2 and PM3 are electrically connected in series with the d.c. output terminals of an adjustable D.C. voltage supply 24 which is connected to three phase A.C. supply lines L1, L2 and L3. On its control input side voltage supply 24 is connected to the outputs of a d.c. tachometer generator 26. It may be assumed that the shaft of generator 26 is driven by a printing press folder or other machine feeding articles into the right end of the conveyor. The output voltage of the supply 24 will thus cause the series connected motors PM1 to PM3 to run in synchronism with the speed of the article input machine.

In a preferred embodiment, a permanent magnet D.C. motor having a base speed of 300 r.p.m. when the impressed armature voltage is 36 volts is used. At a base speed of 300 r.p.m., the linear speed of the article carrying belts will be approximately 400 ft./min. which corresponds to a movement capacity of 72,000 lapped newspaper articles per hour. Thus with the three motors depicted, the voltage supply 24 must be capable of providing a D.C. voltage of at least $3 \times 36$, or 108 volts at the maximum output of the generator 26. A complete conveyor having additional permanent magnet driving motors must have an adjustable voltage supply with a correspondingly greater maximum D.C. output voltage to insure that each motor will be capable of running at its rated base speed at or near the maximum output of the generator 26.

It has been found with this series connection of direct driving permanent magnet motors that the motors will run at equal speeds due to the mechanical connections therebetween provided by the wire belts. Equal torques asserted by the motors is assured by the connection of all of the motor armatures in series across the output terminals of the D.C. voltage supply source.

While only three such d.c. permanent magnet motors have been illustrated in connection with a portion of a complete conveyor, it is to be understood that in a complete system a more or lesser number of such motors can be used. Placement of such motors along a conveyor course will, of course, depend upon torque requirements at various points in the conveyor run.

Figure 4:
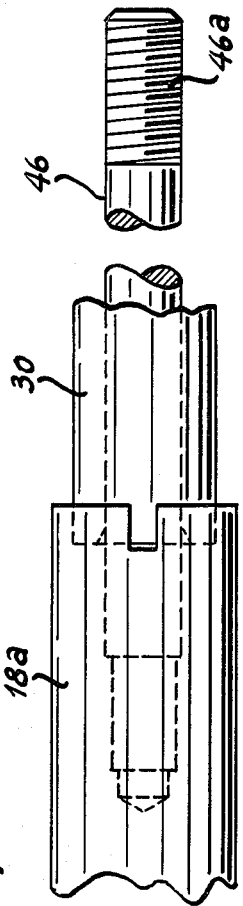
FIG. 4 is a fragmentary view to actual scale of a portion of the mechanism shown in FIG. 3.

FIGS. 2 to 4 depict in some detail a preferred type of d.c. permanent magnet motor and its mounting for driving a portion of a double wire belt conveyor. The motor PM1 is provided with an axially hollow armature shaft 30 which at its right hand end terminates substantially flush with the end of the motor housing and at its left hand end extends beyond the motor housing. The left hand end face of the shaft 30 is provided with a multiple tongue and groove formations which interfit with complemental tongue and grooves formed in the right hand end of the roller shaft 18a.

The roller shaft 18a is afforded rotational bearing support in the bearings members 32 and 34. The members 32 and 34 have upper and lower flanges 32a and 34a respectively, through which extend mounting bolts 36. The bolts 36 extend through elongated openings 38a in mounting brackets 38 that are secured to vertical conveyor pipe or stanchion 40 by U-bolts 42 as shown in FIGS. 2 and 3.

A support shaft 46 for motor PM1 has threaded non-rotatable engagement within a threaded recess formed in roller shaft 18a as best shown in FIG. 4. Shaft 46 extends through the bore of the moror armature shaft 30 with a clearance fit and terminates at a threaded end portion 46a which extends beyond the right end of the motor housing. Washers 48 and a nut 50 disposed about and threaded on the portion 46a prevent any rightward axial movement of the motor PM1 on the shaft 46.

A plate 52 is non-rotatable and rigidly secured to the left hand end of the housing motor PM1 is provided with a generally triangular shaped arm portion 52a. An elongated bolt 54 which is supported in a bracket 56 secured to the stanchion 40 by U-bolt 58, extends through a clearance opening near the end of the arm portion 52a of the plate 52. The bolt 54 has a threaded portion adjacent its right hand end that extends beyond the opposite sides of the arm 52a of the plate and nuts 60 take down thereon against the opposite sides of the plate to secure the bolt to the latter.

It will thus be seen that the motor PM1 is supported on the shaft 30, but is held against any rotation with the shafts 46 and 18a. At the same time the armature shaft 30 is free to rotate and drive the roller shaft 18a through the aforementioned tongue and groove driving connection. This preferred supporting and driving arrangement for the d.c. permanent magnet drive motors is simple, relatively inexpensive and obviates need for gearing between the motor armature shaft and roller shaft.

While the use of the series connected d.c. permanent magnet motor has been shown as applied to wire belt conveyors, it can also be used with other types of belt or web conveyors as well.

I claim:

1. The combination with a belt conveyor which includes continuous belts and drive shafts at spaced intervals for transporting articles in a continuous manner from one point to another, of a drive system for such conveyor comprising a plurality of direct current permanent magnet motors having their armature shafts directly connected to said conveyor drive shafts and adjustable electrical power supply means having direct current output terminals connected in a series circuit with the armatures of all of said motors and including means for varying the d.c. voltage impressed across the series connected motor armatures.

2. The combination according to claim 1 wherein each of said motors is directly coupled to its associated conveyor dirve shaft in a one-to-one driving ratio.

3. The combination according to claim 2 wherein each of said motors is selected to have an armature shaft speed at rated voltage which will afford drive of the conveyor belts at a desired maximum linear speed.

4. The combination according to claim 2 wherein each of said motors has an axially hollow armature shaft which is directly connected to its associated drive shaft, wherein; motor supporting shaft is non-rotatably connected to each drive shaft and extends through the armature shaft of its associated motor, and wherein means connected to the conveyor support structure and each of the motor housings restrain the latter against rotation.

5. In combination, a wire belt conveyor having adjacent sets of cooperating continuous belts which grip and convey articles therebetween, grooved rollers on which said belts are supported and driven and drive shafts for certain of said rollers in each set which are at spaced intervals along the conveyor run, and a drive system for said conveyor comprising a plurality of direct current permanent magnet motors which have their armature shafts directly coupled to said conveyor roller drive shafts and adjustable electrical power supply means having direct current output terminals connected in a series circuit with the armatures of all of said motors and having means for varying the d.c. voltage impressed across the series connected motor armatures.

6. The combination according to claim 5 wherein said means for varying the d.c. voltage impressed across the series connected motor armatures includes a reference tachometer generator for drive in synchronism with a machine feeding articles into said conveyor to thereby afford variation of the D.C. output voltage to said series connected motor armatures in a direct relation to the speed of the article feeding machine.

* * * * *